US006753663B2

United States Patent
Jung et al.

(10) Patent No.: US 6,753,663 B2
(45) Date of Patent: Jun. 22, 2004

(54) ELECTRIC MOTOR CONTROLLED AS AN ELECTROACOUSTIC TRANSDUCER

(75) Inventors: Philipp Jung, Griesheim (DE); Peter Trawinski, Weiterstadt (DE)

(73) Assignee: Braun GmbH (DE)

( * ) Notice: Subject to any disclaimer, the term of this patent is extended or adjusted under 35 U.S.C. 154(b) by 5 days.

(21) Appl. No.: 10/054,828

(22) Filed: Jan. 23, 2002

(65) Prior Publication Data

US 2002/0067084 A1 Jun. 6, 2002

Related U.S. Application Data

(63) Continuation of application No. PCT/EP00/07014, filed on Jul. 21, 2000.

(30) Foreign Application Priority Data

Aug. 14, 1999 (DE) .......................................... 199 38 670

(51) Int. Cl.⁷ ............................................... H02R 7/14
(52) U.S. Cl. ........................... 318/3; 318/685; 318/696; 318/701; 318/700; 318/254; 318/439; 318/138; 15/25
(58) Field of Search ................................ 318/3, 9, 685, 318/696, 701, 254, 703, 739, 792, 798, 805, 807, 372, 599, 811; 388/804, 811, 819, 829, 831; 15/21.1, 22.1, 25

(56) References Cited

U.S. PATENT DOCUMENTS

| 4,042,077 A | * | 8/1977 | McCarthy .................... 188/171 |
| 4,059,779 A | * | 11/1977 | Wistinghausen ............. 310/77 |
| 4,096,417 A | * | 6/1978 | Chambolle ..................... 318/7 |
| 4,422,040 A | * | 12/1983 | Raider et al. ........ 324/158 MG |
| 4,739,346 A | * | 4/1988 | Buckley ...................... 346/138 |
| 4,965,504 A | * | 10/1990 | Ueda et al. .................. 318/802 |
| 5,065,341 A | * | 11/1991 | Gruner et al. .............. 364/516 |
| 5,974,615 A | * | 11/1999 | Schwarz-Hartmann et al. ........................... 15/22.4 |

FOREIGN PATENT DOCUMENTS

| DE | 28 30 527 | 1/1980 |
| EP | 0 352 397 | 7/1988 |
| EP | 0 360 210 | 3/1990 |
| JP | 04178200 | 6/1992 |
| WO | WO 98/01083 | 1/1998 |

* cited by examiner

Primary Examiner—Rina I. Duda
(74) Attorney, Agent, or Firm—Fish & Richardson PC

(57) ABSTRACT

An appliance for personal use such as a toothbrush, an oral irrigator, a shaver, or a kitchen machine, with a driving mechanism constructed as an electric motor and a control stage that supplies energy to the electric motor. When the electric motor is off, the control stage supplies the electric motor with energy adapted in terms of duration and/or amplitude. The electric motor, when off and in its capacity as an electroacoustic transducer, emits at least part of that energy in the form of audible signals.

41 Claims, 3 Drawing Sheets

ELECTRIC MOTOR CONTROLLED AS AN ELECTROACOUSTIC TRANSDUCER

This is a continuation of PCT application serial no. PCT/EP00/07014, filed Jul. 21, 2000, which claims priority from German application serial number 19938670.6, filed Aug. 14, 1999, (pending).

TECHNICAL FIELD

This invention relates to an appliance for personal use such as a toothbrush, an oral irrigator, a shaver, or a kitchen machine, with an electric motor and a control stage for the electric motor's energy supply.

BACKGROUND

Appliances of this type are in widespread use, the known appliances including, for example, appliances for personal use such as electric toothbrushes, electric oral irrigators, electric shavers, and electric household and kitchen appliances or the like. Further known appliances of this type include office communication machines, electrically powered toys or the like. However, the present invention is not restricted in its application to the appliances mentioned but can be used in principle on any appliance that has an electric motor. In many cases there is a need to send information to the users of such appliances. For the transmission of information, the appliances often have separate built-in sound transmitters, light transmitters or some other transmitters of information; for example, toothbrushes are already known that have a type of loudspeaker as a transmitter of information, thus enabling the user to be informed, for instance, about the elapsed brushing time or similar time intervals. These sound transmitters can be constructed as dynamic, electrostatic, magnetostatic or piezo loudspeakers.

The disadvantage of the known appliances is, however, that an additional sound transmitter is required for an acoustic information transfer, which not only increases the manufacturing cost of the appliance but also takes up considerable space in the appliances. Further more, particularly with hermetically encapsulated appliances such as appliances with watertight housings, there is the problem of having to introduce measures that allow the sound waves generated in the interior of the appliance to reach the user.

SUMMARY

An object of the present invention is to further develop an appliance with the features initially referred to such that it is possible, in an extremely simple and economical manner, to generate information signals, in particular user-perceptible, preferably audible signals.

During off-periods of the electric motor the control stage supplies the electric motor with energy. This energy has specific terms of duration and/or amplitude, and when the electric motor is off and is in its capacity as an electroacoustic transducer, this energy emits at least in part in the form of audible signals.

The use of an electric motor as a sound transmitter or electroacoustic transducer when off obviates the need to provide additional, separate components such as loudspeakers or the like. The electric motor, which is present in any case for drive purposes, can be operated during off-periods as an electroacoustic transducer under suitable control from the control stage. Furthermore, the electric motor used in the appliance is mechanically connected to the appliance or the appliance housing. Thus, sound is emitted readily via this connection from the interior of the appliance through the appliance or appliance housing to the environment, and in a volume easily perceived by the user. When the electric motor is off and not called on to supply any mechanical drive energy, the electric motor is suitably controlled to operate as a sound transmitter or loudspeaker. Electric motors here are understood to be a means for converting electric energy into mechanical energy, for example drive energy.

It is an advantage for the electric motor to be constructed as a low-duty motor, for example, as a direct-current motor comprising a rotor and a stator. The invention is not restricted, however, to such motors but can also find application, individually adapted in accordance with the given conditions, in asynchronous, synchronous, stepping and reluctance motors.

In some embodiments, the control stage feeds analog signals to the electric motor. In these embodiments, the analog signal, for example a voltage signal, contains the spectrum of the audible signals to be emitted by the electric motor.

In further embodiments, the analog signal may also contain frequency mixes, for example to generate audible speech or music signals.

Advantageously, the analog signal is a unipolar signal, enabling the electronic components as well as the energy supply, which is, for example, a storage battery or the like, to be constructed with utmost ease.

It is also possible, however, for the analog signal to be a bipolar signal. A bipolar control is slightly more elaborate in its electronic outlay but it enables far higher control amplitudes and hence acoustic power because the average of the bipolar signal is invariably zero.

In a further embodiment of the invention, the control stage feeds digital signals to the electric motor. In this embodiment the digital signals preferably are constructed as pulse-duration-modulated signals and preferably have in particular an essentially constant maximum amplitude.

The fundamental frequency of the digital signal essentially represents the pitch of the audible signal, disregarding the overtones.

It is particularly important for the embodiments of the invention that the time average of the signal lie below a signal threshold value that causes the electric motor to start up.

In this connection it has been shown that the signal threshold value varies in response to the signal frequency and in particular that it rises with the frequency, Hence it is possible to control the electric motor at higher frequencies with higher signal amplitudes, thus resulting in better acoustic power.

The fact that the signal has no frequencies below a frequency threshold value that causes the electric motor to start up is another advantage.

According to a further advantageous aspect of the invention, provision is made for a time delay between the instant the electric motor is shut off as a driving mechanism and the instant it is operated as an electroacoustic transducer.

Advantageously, the electric motor has a brake, for example a mechanical brake with a constant braking torque, or a start-up brake with a braking torque that decreases after the motor starts up.

In various cases of application, it is an advantage for the electric motor to have a device for positioning the rotor in a defined position of rest.

To optimize efficiency in terms of acoustic power output, the electric motor is equipped according to a further embodiment of the invention with an accordingly adapted motor housing or motor housing material.

Provision is made preferably for mechanical elements such as ribs, hard parts or the like between the appliance or appliance housing and the electric motor, which optimize the acoustic emission of the appliance or appliance housing.

The control stage is preferably formed by a driving stage that is connected to the energy supply on one side and to a signal generator on the other side and, where applicable, to additional electronic components.

The appliance of the invention is preferably used as a drive, for example for a toothbrush, an oral irrigator, a shaving system, a household machine, an office machine or the like. Application of the invention is generally not limited to certain types of appliance or appliance applications but is suitable for all appliances that have an electric drive motor and a control device for the electric motor's energy supply.

Further advantages, features, application possibilities and aspects of the present invention will become apparent from the subsequent description of embodiments. In this context, all features described and/or depicted, whether individually or in any reasonable combination, constitute the object of this invention irrespective of their summary in the claims or the cross references of the latter.

DETAILED DESCRIPTION

Figure 1:
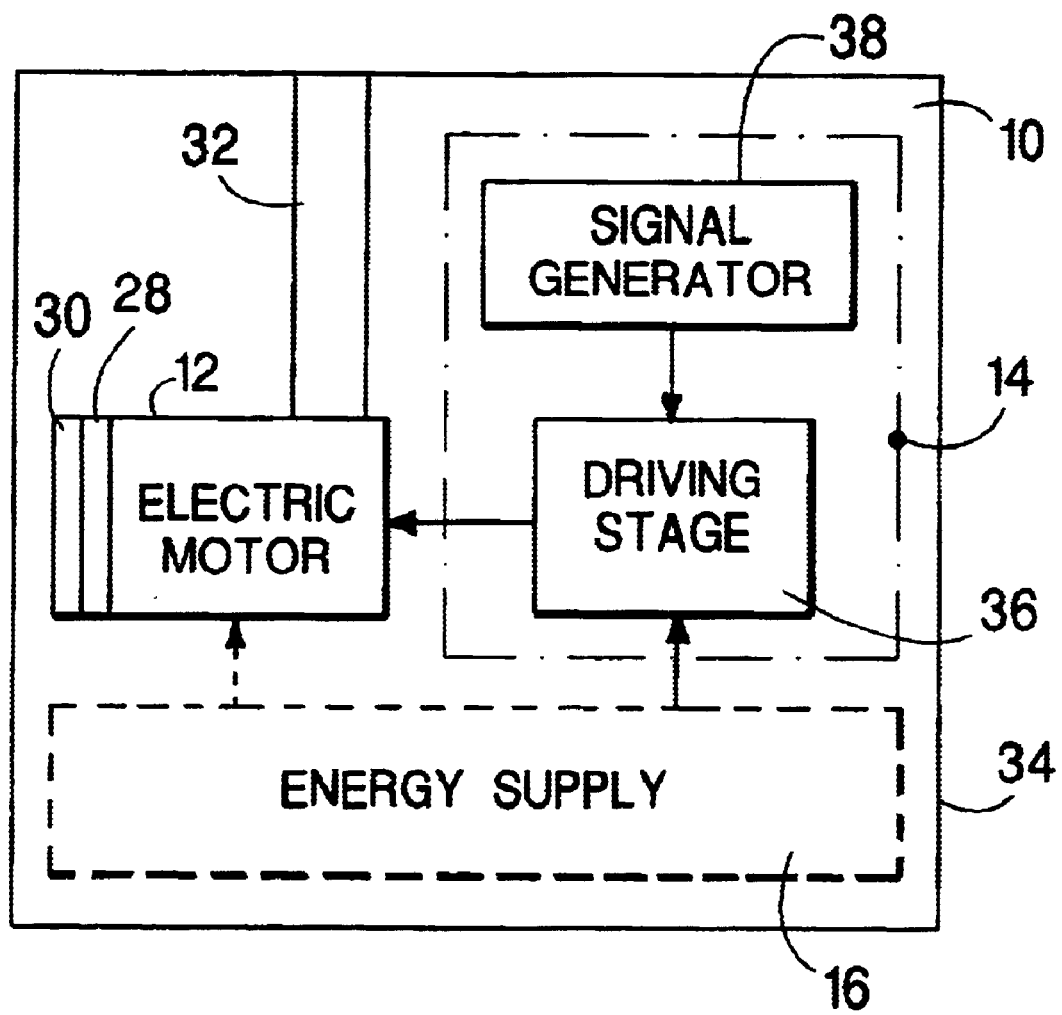
FIG. 1 is a schematic representation in block diagram form of a first embodiment of an appliance according to the invention.

FIG. 1 shows an appliance 10 with a driving mechanism constructed as an electric motor 12 and with a control stage 14 for the energy supply 16 of the electric motor 12. During off-periods of the electric motor 12, the control stage 14 supplies it with energy that has specific terms of duration and/or amplitude such that the electric motor 12, acting as an electroacoustic transducer when off, emits at least part of this energy in the form of audible signals. The electric motor 12 can be constructed as a low-duty motor with a rotor and a stator, for example as a direct-current motor or, alternatively, as an asynchronous, synchronous, stepping or reluctance motor or the like. The control stage 14 is formed by a driving stage 36 that is connected to the energy supply 16 on the one side and toga signal generator 38 on the other side and, where applicable, to additional electronic components. When the electric motor 12 is required for drive purposes the control stage 14 supplies the electric motor 12 with energy so that the electric motor 12 is set in motion, delivering mechanical drive energy, for example.

Figure 2:
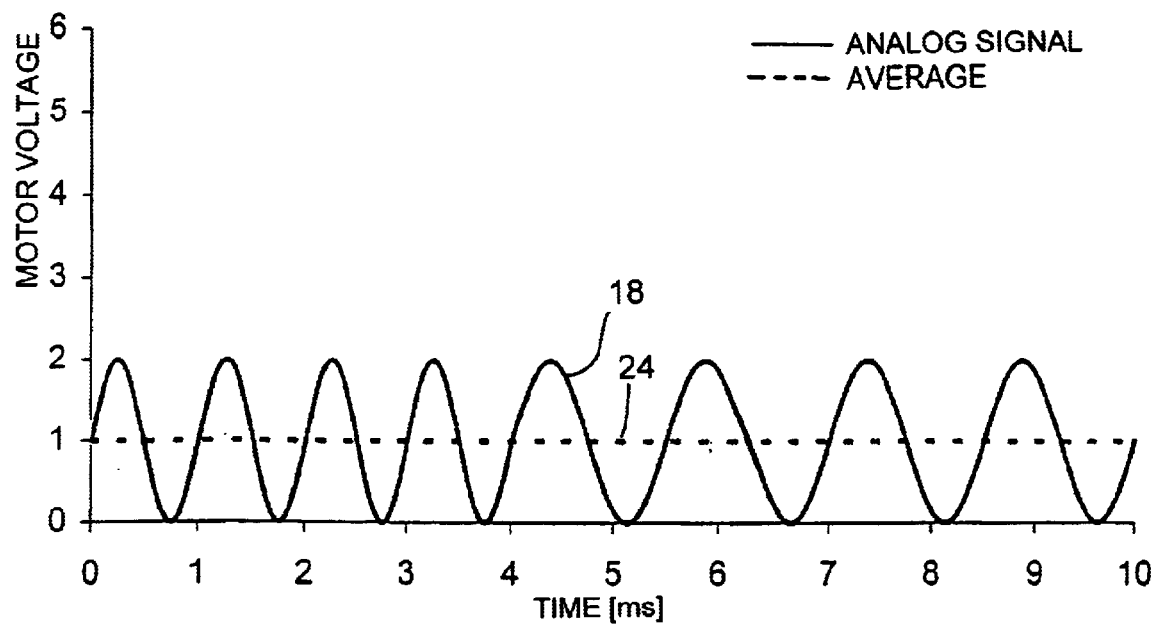
FIG. 2 shows an embodiment of the control using unipolar analog signals of a frequency of 1 kHz and 0.66 kHz.

According to the embodiment of FIG. 2, the electric motor 12 is controlled by unipolar signals 18 that have a frequency of about 1 kHz and 0.66 kHz.

Figure 3:
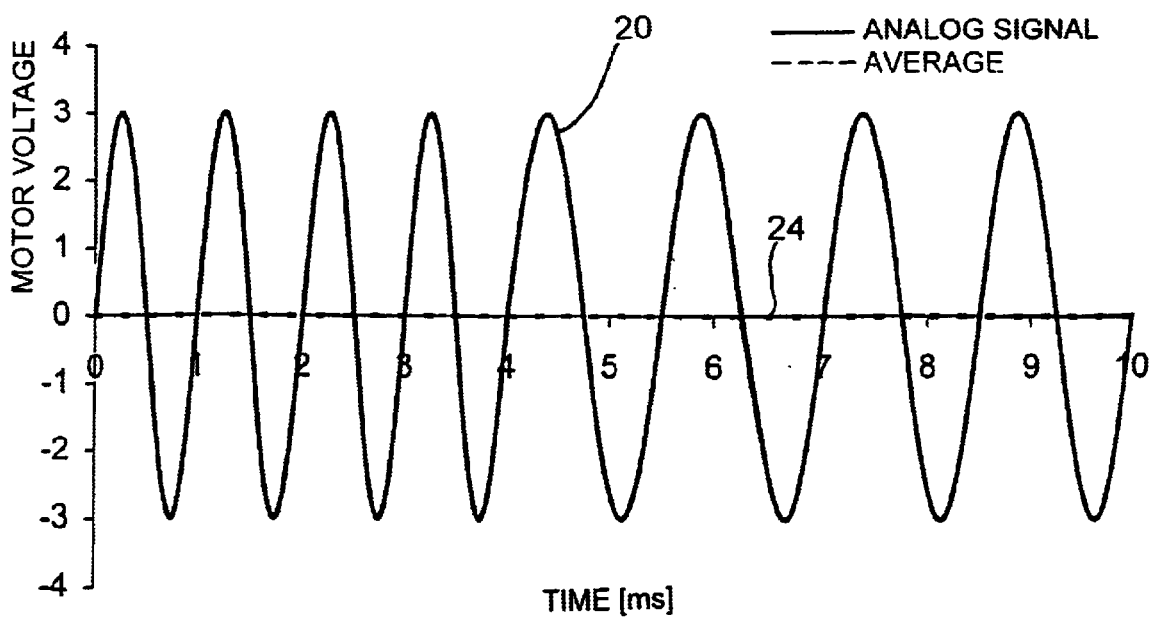
FIG. 3 shows an embodiment of the control using bipolar analog signals of a frequency of 1 kHz and 0.66 kHz.

According to FIG. 3 the electric motor 12 is controlled by bipolar signals 20 of a frequency corresponding to that of FIG. 2.

Figure 4:
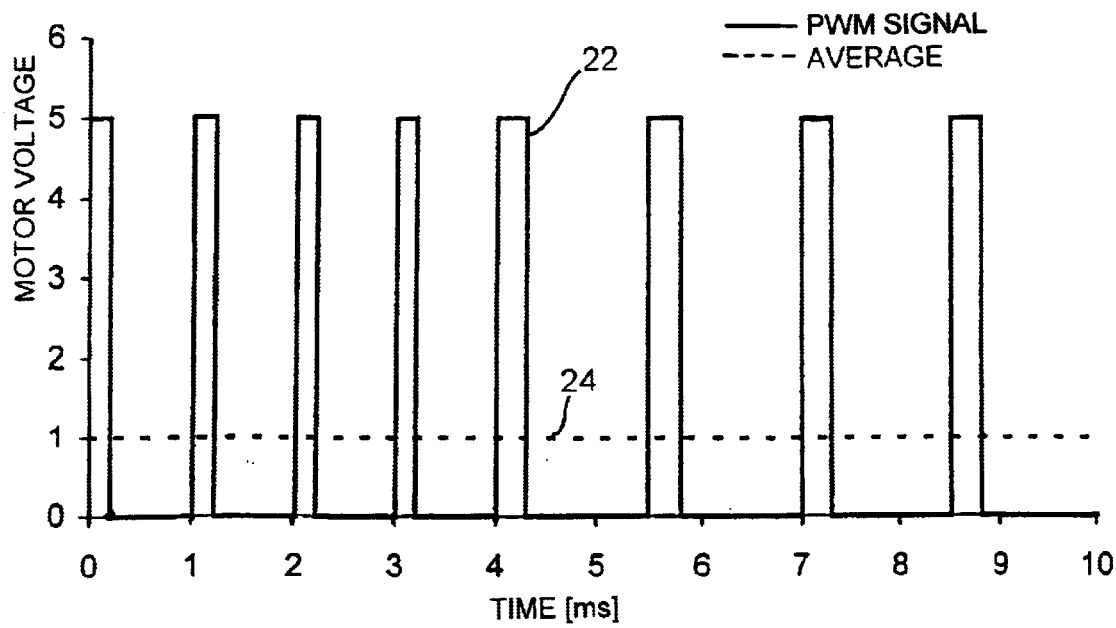
FIG. 4 shows an embodiment of the control using pulse-duration-modulated digital signals of a fundamental frequency of 1 kHz and 0.66 kHz.

FIG. 4 shows a control of the electric motor 12 using pulse-duration-modulated signals 22, the fundamental frequency of these signals again lying at around 1 kHz and 0.66 kHz.

In all the embodiments of FIGS. 2, 3 and 4, the time average 24 of the signals 18, 20, 22 lies below a signal threshold value 26 that causes the electric motor 12 to start up.

Figure 5:
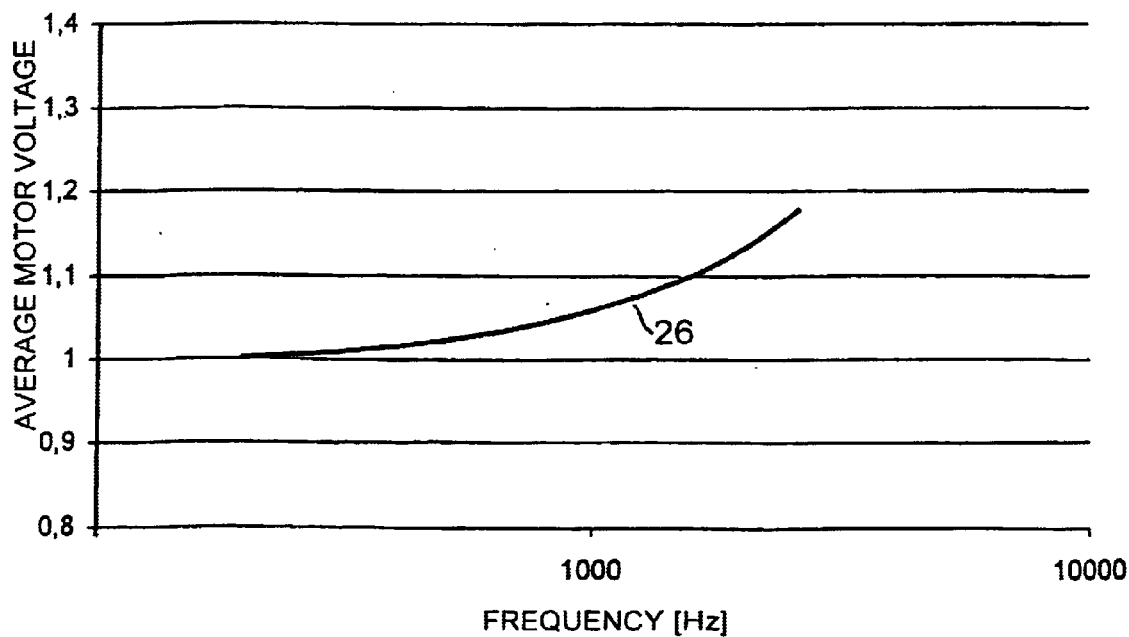
FIG. 5 shows an embodiment of the frequency-dependent rise of the signal threshold value.

In FIG. 5 the signal threshold value 26 as a function of the signal frequency is plotted for a special embodiment of an electric toothbrush equipped with a low-duty direct-current motor. Clearly, this signal threshold value 26 rises as the frequencies grow. It will be understood, of course, that the dependence of the signal threshold value 26 on the frequency differs very greatly from one application to the next.

A series of advantages, potential applications and embodiments will be described in more detail in the following:

The invention features a novel application of an electric motor 12, particularly allow-duty motor, in which the electric motor 12 is used as an electroacoustic transducer by a special control when off. This use entails supplying an electric motor when off with energy via a suitable electronic control stage 14 such that the electric motor 12 does not start up or just about does not start up, the energy being processed over time so that at least part of this energy is delivered by the electric motor 12 in audible form. The higher the effective value of the energy supplied to the electric motor, the higher the acoustic power output. Such a motor control can be effected either by a suitable analog voltage signal, whether a unipolar signal 18 or a bipolar signal 20, or a pulse-duration-modulated signal with essentially constant voltage via, for example, a driving stage 36 such as a transistor or the like.

The analog signal 18, 20 contains the spectrum of the desired audible signal, whereas with the pulse-duration-modulated signal 22 the fundamental frequency or pulse repeat frequency of the control represents the pitch of the audible signal. With analog control it is, generally possible to generate any frequency mixes, for example speech frequencies, music frequencies or the like, while pulse-duration-modulated control permits, under circumstances, only limited superposition of discrete frequencies.

A unipolar signal 18 is not allowed to exceed, with respect to its time average 24, a signal threshold value 26 that causes the electric motor 12 to start up. When using a pulse duration modulated signal 22 it is necessary to select the pulse duty factor so that the electric motor 12 is prevented from starting up. Because the start-up characteristic of the electric motor 12 is frequency-dependent, the corresponding signal value must be set either for the most unfavorable case or adapted in a frequency-dependent manner for a particular embodiment according to the frequency response of the signal threshold value 26 of FIG. 6, for example.

The static friction of the mechanical system of the electric motor 12 when off is always greater than the friction while the electric motor is switched on to drive the system to which it is coupled. If maximum controllability is wanted, suitable devices are required during a changeover from the "motor" to the "acoustic" mode of the electric motor 12 to ensure that the electric motor 12 reliably comes to a standstill, thus producing static friction conditions. This can be ensured by providing for a suitable time delay, for example, which is activated between the motor as a driving mechanism being switched off and its control as an acoustic transducer being switched on.

Compared to a control of the electric motor 12 with unipolar signals 12, control of the, electric motor 12 by means of bipolar signals 20 permits far higher amplitudes because the average of the bipolar signal invariably adopts zero value.

As such it is important with all types of control of the electric motor 12 in the "acoustic" mode to ensure that the analog or digital signals do not have any frequencies lying below a frequency threshold value that causes the electric motor 12 to start up. Such a case could occur, for example, when the electric motor 12 is controlled by means of bipolar signals 20 of a frequency of perhaps 1 to 10 Hz. Depending on the system's inertia, the rotor of the electric motor 12 could be set in alternating rotation regardless of the average of the bipolar signal 20 lying at zero. In practice it makes sense, therefore, for the lowest frequencies of the analog and digital signals 18, 20, 22 not to be lower than about 50 Hz or about 100 Hz. The lowest frequency is also defined by the inert mass of the rotor and can therefore vary with the type of electric motor 12 used. The smaller the inert mass of the rotor, the higher the lower limit frequency.

A bipolar control affords higher signal amplitudes than a unipolar control. Thus, it is also possible to set a correspondingly higher value for the sound pressure with a bipolar control. The only limiting factor is the current carrying capacity of the commutators and the maximum power loss in the rotor windings.

Unwanted starting up of the motor always occurs when the average torque applied by the control exceeds the starting torque of the appliance 10. If the maximal loudness possible in the particular case of application is insufficient, the starting torque of the electric motor 12 can be increased by suitable mechanical devices. In this context, it is possible, for the electric motor 12 to be used with a brake 28, for example, a mechanical brake with constant braking torque or a start-up brake with a braking torque that decreases after start-up.

The electric motors 12 are not constructed with perfect rotational symmetry as regards their windings and magnetically effective components. Thus, the type and amplitude of the forces resulting from the signals 18, 20, 22, and hence the amplitude and tone color of the audible signals supplied by the electric motor 12 when off, can also depend on the angular position of the rotor relative to the stator. To ensure a certain reproducibility in this regard, suitable devices can be provided to ensure that the motor always comes to rest in a defined rotor position relative to the stator. For example, a device 30 can be provided for the defined positioning of the rotor when at rest.

Preventing the electric motor 12 from starting up in the "acoustic" mode as the result of the control when off also is important when applied to other types of motor including, for example, asynchronous, synchronous, stepping and reluctance motors. Therefore the driving winding packs can equally receive any energy input modulated with the audible signal, provided the current and power loss loading of the components involved is not exceeded.

To increase efficiency and hence the maximum possible acoustic power output, the electric motor 12 can itself be optimized by suitable provisions including, for example, an adapted motor housing or motor housing material, for emitting the audible signals.

A further possibility is to use suitable elements 32, such as ribs, hard parts or the like, to optimize the acoustic coupling between the appliance 10 or the appliance housing 34 and the electric motor 12 or the motor housing.

The mode of operation of the control of the invention can generally be described as follows:

The modulated currents flowing in the driving windings of the motor as the result of the control with the signals 18, 20, 22 during the off-period of the electric motor 12 generate magnetic fields that are modulated with the useful audible signal. In various ways, for example via the forces of magnetic attraction of current-carrying conductors, ferromagnetic materials, magnetostriction and the like, these magnetic fields exert radial, tangential and, where applicable, also axial forces on the rotor and housing, leading to deformations or movements in corresponding bearings. The forces acting on the rotor can be transferred, for example via said bearings or other coupling locations, to the motor housing or the appliance 10 or appliance housing 34. The appliance housing 34, oscillating on its surface like a loudspeaker, can pass on these movements in audible form directly to the ambient air or, as structure-borne sound, to other structures that emit the signal in generally amplified form to the air by the resonant body principle. The geometry of the electric motor 12 itself and of the components coupled thereto such as the appliance housing 34 or the like exert through their natural resonances a filtering effect on the spectrum of the signal and hence generally lead to a limited frequency range in the form of a bandpass in which audible signals can be, meaningfully emitted from the appliance 10.

One embodiment of the appliance 10 is constructed as a handpiece of an electric toothbrush. A toothbrush drivable by the electric motor 12 is attachable to the handpiece, the electric motor 12 constructed as a low-duty direct-current motor used in certain operating modes to output various tunes. Conventional toothbrushes of this type are described in EP 0 850 027 A1, for example, which is incorporated by reference herein.

Acoustic measurements performed on this individual appliance 10 result in a useful spectrum in the range from about 200 Hz to about 2.5 kHz because the amplitude drop of the useful audible signal in this frequency range remains within meaningful limits and the useful signal can be well heard by the user. FIGS. 2 and 3 show the control of the driving stage 36 by means of analog unipolar signals 18 and bipolar signals 20, respectively. By contrast, FIG. 4 shows the control by means of pulse-duration-modulated signals 22. When control uses pulse-duration-modulated signals 22 of an amplitude corresponding to the motor's rated voltage, pulse duty factors of up to about 20% result, with which the electric motor 12 can be relied upon not to start up as yet. FIG. 5 shows the frequency-dependent rise of the signal threshold value 26, which rises in the mentioned frequency range from about 18% at around 200 Hz to about 23% to 24% at around 2,500 Hz.

Appliance 10 obviates the need to use a sound transmitter because the electric motor 12, which is available in any case to operate appliance components, is itself used as a sound transmitter by means of a special control when off. This approach also involves utilizing the coupling of the electric motor 12 to the appliance housing 34 to emit sound from the interior of the appliance housing 34 to the environment without requiring any openings or the like.

List of Reference

10 appliance
12 electric motor
14 control stage
16 energy supply
18 unipolar signal
20 bipolar signal
22 pulse-duration-modulated signal
24 time average
26 signal threshold value
28 brake
30 device
32 element
34 appliance housing
36 driving stage
38 signal generator

What is claimed is:

1. An appliance for personal use comprising:
   a driving mechanism including an electric motor; and
   a control stage, wherein the control stage is configured, when the electric motor is turned off, to send a unipolar analog signal from an energy supply to the electric motor, causing the motor to emit audible signals, and wherein the unipolar analog signal has a time average that lies below the signal value required for motor activation.

2. The appliance of claim 1, wherein the signal value required for motor activation varies in response to the unipolar analog signal frequency.

3. The appliance of claim 2, wherein the signal value required for motor activation increases with the frequency.

4. The appliance of claim 1, wherein the appliance comprises a toothbrush, an oral irrigator, a shaver, or a household machine.

5. The appliance of claim 1, wherein the electric motor is an asynchronous, synchronous, stepping, or reluctance motor.

6. The appliance of claim 1, wherein the electric motor comprises a rotor and a device for positioning the rotor in a defined position of rest when the motor is off.

7. An appliance for personal use comprising:
   a driving mechanism including an electric motor; and
   a control stage, wherein the control stage is configured, when the electric motor is turned off, to send an energy signal with a time average lying below the signal value required for motor activation, from an energy supply to the electric motor, causing the motor to emit audible signals.

8. The appliance of claim 7, wherein during operation, the control stage feeds an analog signal to the electric motor.

9. The appliance of claim 8, wherein the analog signal comprises a spectrum of audible signals to be emitted by the electric motor.

10. The appliance of claim 9, wherein the analog signal comprises a voltage signal.

11. The appliance of claim 7, wherein during operation, the control stage feeds a digital signal to the electric motor.

12. The appliance of claim 7, wherein the signal value required for motor activation varies in response to the signal frequency.

13. The appliance of claim 12, wherein the signal value required for motor activation increases with the frequency.

14. The appliance of claim 7, wherein the appliance comprises a toothbrush, an oral irrigator, a shaver, or a household machine.

15. The appliance of claim 7, wherein the electric motor is an asynchronous, synchronous, stepping, or reluctance motor.

16. The appliance of claim 7, wherein the electric motor comprises a rotor and a device for positioning the rotor in a defined position of rest when the motor is off.

17. An appliance for personal use comprising:
   a driving mechanism including an electric motor; and
   a control stage, wherein the control stage is configured, when the electric motor is turned off, to send an energy signal from an energy supply to the electric motor, causing the motor to emit audible signals, and wherein the energy signal does not have any frequencies below the frequency value required for motor activation.

18. The appliance of claim 17, wherein during operation, the control stage feeds an analog signal to the electric motor.

19. The appliance of claim 18, wherein the analog signal comprises a spectrum of audible signals to be emitted by the electric motor.

20. The appliance of claim 19, wherein the analog signal comprises a voltage signal.

21. The appliance of claim 17, wherein during operation, the control stage feeds a digital signal to the electric motor.

22. The appliance of claim 17, wherein the appliance comprises a toothbrush, an oral irrigator, a shaver, or a household machine.

23. The appliance of claim 17, wherein the electric motor is an asynchronous, synchronous, stepping, or reluctance motor.

24. The appliance of claim 17, wherein the electric motor comprises a rotor and a device for positioning the rotor in a defined position of rest when the motor is off.

25. The appliance of claim 17, wherein the energy signal has a time average that lies below the signal value required for motor activation.

26. An appliance for personal use comprising:
   a driving mechanism including an electric motor; and
   a control stage, wherein the control stage is configured, when the electric motor is turned off, to send an energy signal from an energy supply to the electric motor, causing the motor to emit audible signals, and wherein the control stage generates a time delay between the time when the motor is deactivated as a driving mechanism and the time when the motor is used to emit audible signals.

27. The appliance of claims 26, wherein during operation, the control stage feeds an analog signal to the electric motor.

28. The appliance of claim 27, wherein the analog signal comprises a spectrum of audible signals to be emitted by the electric motor.

29. The appliance of claim 28, wherein the analog signal comprises a voltage signal.

30. The appliance of claim 26, wherein during operation, the control stage feeds a digital signal to the electric motor.

31. The appliance of claim 26, wherein the appliance comprises a toothbrush, an oral irrigator, a shaver, or a household machine.

32. The appliance of claim 26, wherein the electric motor is an asynchronous, synchronous, stepping, or reluctance motor.

33. The appliance of claim 26, wherein the electric motor comprises a rotor and a device for positioning the rotor in a defined position of rest when the motor is off.

34. An appliance for personal use comprising:
   a driving mechanism including an electric motor;
   a control stage, wherein the control stage is configured, when the electric motor is turned off, to send an energy signal from an energy supply to the electric motor, causing the motor to emit audible signals; and
   a motor housing disposed around the motor, wherein the housing and electric motor are structurally connected for acoustic emission.

35. The appliance of claim 34, wherein during operation, the control stage feeds an analog signal to the electric motor.

36. The appliance of claim 35, wherein the analog signal comprises a spectrum of audible signals to be emitted by the electric motor.

37. The appliance of claim 36, wherein the analog signal comprises a voltage signal.

38. The appliance of claim 34, wherein during operation, the control stage feeds a digital signal to the electric motor.

39. The appliance of claim 34, wherein the appliance comprises a toothbrush, an oral irrigator, shaver, or a household machine.

40. The appliance of claim 34, wherein the electric motor is an asynchronous, synchronous, stepping, or reluctance motor.

41. The appliance of claim 34, wherein the electric motor comprises a rotor and a device for positioning the rotor in a defined position of rest when the motor is off.

* * * * *